United States Patent
Fan et al.

(10) Patent No.: US 11,490,339 B1
(45) Date of Patent: Nov. 1, 2022

(54) METHOD FOR DETERMINING PILOT POWER, COMMUNICATION DEVICE, AND STORAGE MEDIUM

(71) Applicant: PROSE Technologies Co., Ltd., Jiangsu (CN)

(72) Inventors: Cunxiao Fan, Jiangsu (CN); Renzhen Xu, Jiangsu (CN); Xiuping Wang, Jiangsu (CN); Zhongjie Chen, Jiangsu (CN)

(73) Assignee: PROSE TECHNOLOGIES CO., LTD., Suzhou (CN)

( * ) Notice: Subject to any disclaimer, the term of this patent is extended or adjusted under 35 U.S.C. 154(b) by 0 days.

(21) Appl. No.: 17/750,308

(22) Filed: May 21, 2022

(30) Foreign Application Priority Data

Nov. 29, 2021 (CN) .......................... 202111427629.0

(51) Int. Cl.
*H04W 52/32* (2009.01)
*H04W 24/08* (2009.01)
*H04W 52/34* (2009.01)

(52) U.S. Cl.
CPC ......... *H04W 52/325* (2013.01); *H04W 24/08* (2013.01); *H04W 52/343* (2013.01)

(58) Field of Classification Search
CPC ...... H04L 41/145; H04L 43/00; H04W 16/18; H04W 24/08; H04W 52/325; H04W 52/343
See application file for complete search history.

(56) References Cited

U.S. PATENT DOCUMENTS

| | | | | |
|---|---|---|---|---|
| 8,199,766 B2* | 6/2012 | Li | ......................... | H04L 1/0002 370/431 |
| 2014/0355572 A1* | 12/2014 | Khandekar | ....... | H04W 74/0891 370/336 |
| 2017/0105217 A1* | 4/2017 | Kwon | ................. | H04W 72/082 |
| 2020/0045651 A1* | 2/2020 | Cui | ...................... | H04W 52/365 |
| 2021/0045062 A1* | 2/2021 | Ryu | ...................... | H04W 52/10 |
| 2021/0320777 A1* | 10/2021 | Dutta | ................... | H04L 27/2614 |
| 2022/0053563 A1* | 2/2022 | Chande | ............. | H04W 74/0808 |

FOREIGN PATENT DOCUMENTS

CN           1407819 A   *   4/2003   .......... H04W 52/267

* cited by examiner

*Primary Examiner* — Thomas R Cairns (57) ABSTRACT

A method includes acquiring a plurality of sample level values of a received current frame signal; determining a current power of the current frame signal based on the plurality of sample level values; determining a current traffic signal ratio of the current frame signal based on the plurality of sample level values; taking the current power as a current pilot power of the current frame signal if it is determined that the current traffic signal ratio is less than or equal to a predetermined ratio; and determining the current pilot power of the current frame signal based on the current power, the current power floating upper limit and the current power floating lower limit if it is determined that the current traffic signal ratio is greater than the predetermined ratio. Thus, the pilot power can be accurately determined for different traffic signal ratios.

20 Claims, 5 Drawing Sheets

METHOD FOR DETERMINING PILOT POWER, COMMUNICATION DEVICE, AND STORAGE MEDIUM

FIELD

Embodiments of the present disclosure relate generally to the field of communications, and more specifically to a method for determining pilot power, a communication device, and computer storage medium.

BACKGROUND

With the development of communication technology, 5G has been widely deployed and applied. However, in practice, the amplitude of real-time power jitter of 5G NR (New Radio) signal is large, which brings trouble for openness and maintenance of communication equipments. In addition, in the 5G NR signals, control resource blocks (RBs) and traffic resource blocks are interleaved in a physical frame structure, so that the real-time powers will be read with large errors.

SUMMARY

A method for determining pilot power, communication device, and computer storage medium are provided, which may accurately determine the pilot power for different traffic signal ratios. Herein, a traffic signal ratio indicates a ratio of the number of online/active users of a base station to a capacity of the base station (i.e. a total number of users that may be supported by the base station).

According to a first aspect of the present disclosure, a method for determining pilot signal is provided. The method includes acquiring a plurality of sample level values of a received current frame signal; determining a current power of the current frame signal based on the plurality of sample level values; determining a current traffic signal ratio of the current frame signal based on the plurality of sample level values; taking the current power as a current pilot power of the current frame signal if it is determined that the current traffic signal ratio is less than or equal to a predetermined ratio; and determining the current pilot power of the current frame signal based on the current power, the current power floating upper limit and the current power floating lower limit if it is determined that the current traffic signal ratio is greater than the predetermined ratio.

According to a second aspect of the present disclosure, a communication device is provided. The communication device comprises: at least one processor; and a memory communicatively coupled to the at least one processor; wherein the memory stores instructions executable by the at least one processor to enable the at least one processor to perform the method according to the first aspect.

In a third aspect of the present disclosure, there is provided a computer readable storage medium storing computer programs which, when being executed by a processor, implements the method according to the first aspect of the present disclosure.

It should be understood that the description herein is not intended to identify key or critical features of the embodiments of the disclosure or to delineate the scope of the disclosure. Other features of the present disclosure will become readily apparent from the following description.

BRIEF DESCRIPTION OF THE DRAWINGS

The above and other features, advantages, and aspects of embodiments of the present disclosure will become more apparent with reference to the following detailed description when taken in conjunction with the accompanying drawings. In the drawings, the same or similar reference numbers indicate the same or similar elements.

DETAILED DESCRIPTION

The exemplary embodiments of the disclosure will described hereinafter in conjunction with the accompanying drawings. Various details of the embodiments of the disclosure are included to facilitate understanding, which should be construed as exemplary only. Accordingly, those of ordinary skill in the art will recognize that various changes and modifications may be made to the embodiments described herein without departing from the scope and spirit of the present disclosure. Also, descriptions of well-known functions and constructions are omitted from the following description for clarity and conciseness.

As used herein, the terms "comprises", "comprising", and variations thereof mean "including, but not limited to". The term "or" means "and/or" unless stated otherwise. The term "based on" means "based, at least in part, on". The terms "one example embodiment" and "one embodiment" mean "at least one example embodiment". The term "another embodiment" means "at least one further embodiment". The term "unit", "module" and "port" include circuit/circuits. The terms "first", "second", and the like may refer to different or identical objects. Other explicit and implicit definitions may also be included below.

As described above, in the 5G NR signals, control resource blocks (RBs) and traffic resource blocks are interleaved in the physical frame structure, so that the real-time powers will be read with large errors.

The applicant analyzes the measured waveforms of 5G NR frame signals and summarizes the following conclusions: 1) according to a base station configuration, a pilot signal may appear in an interval frame; 2) there are two continuous regions corresponding to the pilot signal in time domain in a frame; 3) the traffic signals are evenly spread over resource blocks of the whole frame in time domain; 4) when the traffic signal ratio of the base station is 10%-90%, the signal is relatively stable, while when the traffic signal ratio of the base station is 0%-10%, the signal fluctuates greatly; and 5) The pilot signal is always present and does not vary much.

To address, at least in part, one or more of the above problems and other potential problems, example embodiments of the present disclosure propose a scheme for determining pilot power. The scheme may include acquiring a plurality of sample level values of a received current frame signal; determining a current power of the current frame signal based on the plurality of sample level values; determining a current traffic signal ratio of the current frame signal based on the plurality of sample level values; taking the current power as a current pilot power of the current frame signal if it is determined that the current traffic signal ratio is less than or equal to a predetermined ratio; and determining the current pilot power of the current frame signal based on the current power, the current power floating upper limit and the current power floating lower limit if it is determined that the current traffic signal ratio is greater than the predetermined ratio. In this manner, the pilot power may be accurately determined for different traffic signal ratios.

Hereinafter, specific examples of the present scheme will be described in more detail with reference to the accompanying drawings.

Figure 1:
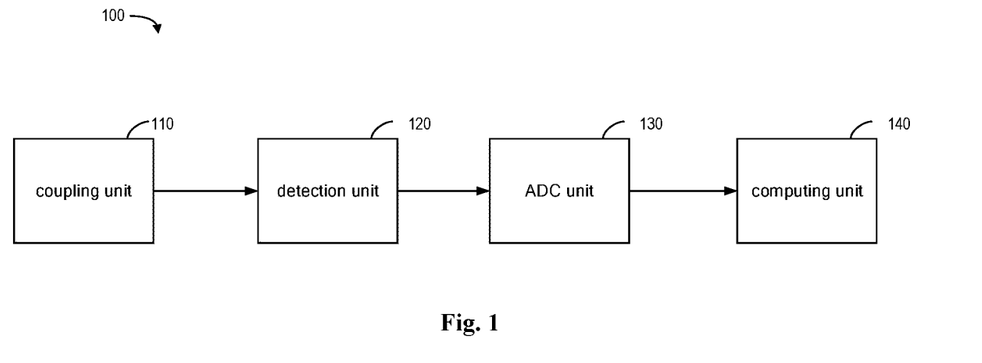
FIG. 1 is a schematic diagram of a communication device 100 in accordance with embodiments of the present disclosure.

FIG. 1 shows a schematic diagram of an example of a communication device 100 according to embodiments of the present disclosure. The communication device 100 may comprise a coupling unit/circuit 110, a detection unit/circuit 120, an analog-to-digital conversion (ADC) unit/circuit 130 and a computing unit/circuit 140.

The coupling unit 110 is used for coupling with the signal main path to acquire the current frame signal received on the signal main path. The coupling unit 110 may be implemented using any suitable coupling circuit.

The detection unit 120 is used for performing power detection on the acquired current frame signal (for example, a 5G NR frame signal) to generate a power level of the current frame signal. The detection unit 120 may be implemented using any suitable detection circuit. In some embodiments, filter capacitors may be disposed between the detection unit 120 and the ADC unit 130, which may also be referred to as post-stage filter capacitors of the detection unit 120. The post-stage filter capacitors may be located, for example, at the CLPF port (low-pass filter capacitor port) and VOUT port (level output port) of the detection unit 120, for example, and may be set to 4.7 nF and 10 nF, respectively. According to the experimental results, the ripple/rising edge duration is 80 mv/9 us when the post-stage filter capacitors are removed; the ripple/rising edge duration is 47 mv/43 us when the post-stage filter capacitors are added, and the ripple/rising edge duration is 57 mv/28 us when the post-stage filter capacitor at the CLPF port is set to 4.7 nF and the post-stage filter capacitor at the VOUT port is set to 10 nF. Thus, the above-mentioned setting of the post-stage filter capacitors can achieve a balance between the rising edge duration of the power level of the signal and the ripple size, which is suitable for the detection of 2G/3G/4G/5G signals.

The ADC unit 130 is used for sampling the detected power level of the current frame signal to obtain a plurality of sample level values of the received current frame signal. The sampling frequency of the ADC unit 130 may include, for example but not limited to, 200 KHz. The ADC unit 130 may be implemented using any suitable ADC circuitry.

The computing unit 140 may comprise a processing unit and a memory unit. The processing unit may comprise a dedicated processing unit, such as a field programmable gate array FPGA and an application specific integrated circuit ASIC, and a general purpose processing unit, such as a micro control unit MCU, a central processing unit CPU. The memory unit may comprise a random access memory RAM and a read-only memory ROM.

The computing unit 140 is used for acquiring a plurality of sample level values of the received current frame signal; determining a current power of the current frame signal based on the plurality of sample level values; determining a current traffic signal ratio of the current frame signal based on the plurality of sample level values; taking the current power as the current pilot power of the current frame signal if it is determined that the current traffic signal ratio is less than or equal to a predetermined ratio; and determining the current pilot power of the current frame signal based on the current power, the current power floating upper limit and a floating lower limit of the current power if it is determined that the current traffic signal ratio is greater than the predetermined ratio.

Thus, the pilot power may be accurately determined for different traffic signal ratios.

Figure 2:
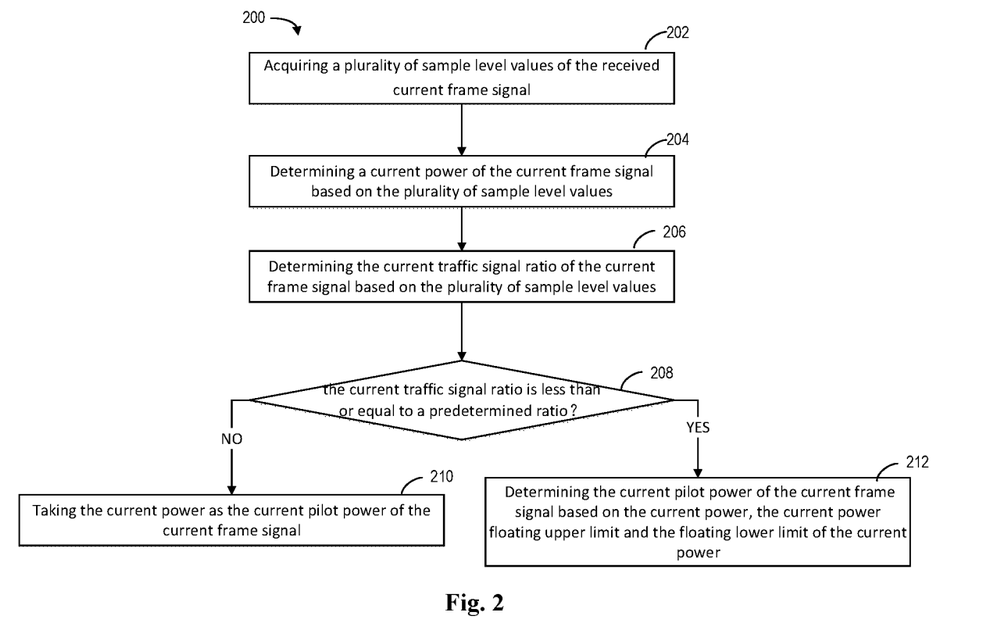
FIG. 2 is a schematic diagram of a method 200 for determining pilot power in accordance with embodiments of the present disclosure.

FIG. 2 illustrates a flow diagram of a method 200 for determining a pilot power in accordance with embodiments of the present disclosure. The method 200 may be performed by the computing unit 140 as shown in FIG. 1, for example. It should be appreciated that the method 200 may also include additional blocks not shown and/or may omit the illustrated blocks, and the scope of the present disclosure is not limited in this aspect.

At block 202, the computing unit 140 acquires a plurality of sample level values of the received current frame signal.

The plurality of sample level values are acquired by sampling by the ADC unit, for example, and the sampling frequency may include but not limited to 200 KHz, for example.

Figure 3:
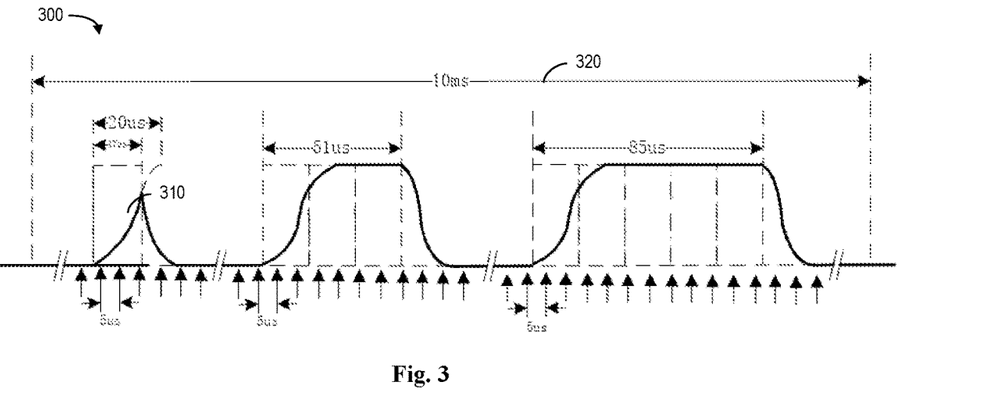
FIG. 3 is a schematic diagram of an example 300 of frame sampling according to embodiments of the present disclosure.

As shown in FIG. 3, taking a 5G NR signal as an example, for example, the base station adopts a configuration that is of a mode with a sub-carrier interval of 60 kHz, each symbol 310 (symbol) covers 2-3 sampled points (about 17 us for each symbol) when the sampling frequency of the ADC unit reaches 200 KHz (i.e., every 5 us), and the total number of sampled points is about 2000 in a whole 10 ms frame 320. By setting the post-stage capacitors, the rising edge duration can be controlled to around 20 us, which is equivalent to one symbol duration. When there are consecutive valid symbols (3 symbols for 51 us and 5 symbols for 85 us, for example), the ratio of the power level rising edge/declining edge duration clipped by the hardware will be reduced, and the sampled points of valid data will be increased, which is beneficial to improve the sampling accuracy. In addition, when the traffic is relatively idle, power level of the corresponding traffic channel will be relatively low, and the time-domain valid power level will be dominated by control channels such as PDCCH, DMRS for PDSCH, SSB and CSI-RS, and when the traffic is relatively busy, the power level of the corresponding traffic channel will be relatively high, and the time-domain valid power level will be dominated by traffic channels such as PDSCH and PUSCH. According to the experimental data analysis, when the traffic signal ratio is less than 10% of full capacity, the sampled signals in the time domain are dominated by control signals including pilot signals such as DMRS and CSI-RS, and in this case, the current power of the signal reflects the power of the pilot signal. On the contrary, the traffic signals are dominant, in which case the current power of the signal reflects the power of the superposition of the pilot signal and the traffic signal.

It should be understood that 5G NR signals, sampling frequency of 200 KHz, 10 ms frame, etc., are all illustrative and other signals (4G, 3G, 2G, etc., for example), other subcarrier intervals, other frame lengths and other sampling frequencies are possible, and the scope of the present disclosure is not limited in this aspect.

At block 204, the computing unit 140 determines a current power of the current frame signal based on the plurality of sample level values.

In particular, the computing unit 140 may rank the plurality of sample level values based on the detection characteristics to generate a ranking result, and determine a plurality of valid level values from the ranking result, the plurality of valid level values ranking in the ranking result by a predetermined percentage. For example, in the case where the detection characteristic of the detection tube or detection unit is forward detection, a plurality of sample level values may be ranked from large to small to generate a ranking result. For example, in the case where the detection characteristic of the detection tube or detection unit is reverse detection, the plurality of sample levels may be ranked from small to large to generate a ranking result. Subsequently, the first 3% of the sample level values are obtained from the ranking result as the plurality of valid level values. It should be understood that the first 3% is by way of example only, and that other suitable values may be used for the predetermined percentage, such as 1%, 5%, etc. The actual value of the predetermined percentage may, for example, be adjusted based on different signal patterns.

The computing unit 140 may then determine an average of the plurality of valid level values and determine the current power based on the average of the plurality of valid level values. For example, the average of the plurality of valid level values is converted to the current power by a relationship between power levels and powers.

At block 206, the computing unit 140 determines the current traffic signal ratio of the current frame signal based on the plurality of sample level values.

In some embodiments, the computing unit 140 may determine the average of the plurality of sample level values. The computing unit 140 may then determine the traffic signal ratio associated with the average as the current traffic signal ratio based on a relationship between level values and traffic signal ratios.

The relationship between level values and traffic signal ratios may be statistical based on historical sample level values (averages or instantaneous values) and historical traffic signal ratios for the frame signals, which may be fitted as a non-linear curve or may be discrete values, for example. As stated above, when the traffic signal ratio of the base station is 10%-90%, the signal is relatively stable, that is to say, the variation of the sample level values for the frame signal is relatively small (accordingly, the variation of the power of the frame signal is relatively small), that is to say, the corresponding curve is relatively flat. When the traffic signal ratio of the base station is less than 10%, the signal fluctuation is large, and the variation of the sample level values for the frame signal is relatively large (accordingly, the variation of the power of the frame signal is relatively large), that is, the corresponding curve is relatively steep.

In some other embodiments, the computing unit 140 may determine a ratio of valid level values to the plurality of sample level values, wherein the valid level values are sample level values greater than or equal to a predetermined level value. The predetermined level value may, for example, includes but is not limited to, 1.2 v. It should be understood that 1.2 v is by way of example only and that the actual value of the predetermined level value may be based on different modes of the signal, the characteristics of the detection tube and the scaling of the detection circuit.

The computing unit 140 may then determine, as the current traffic signal ratio, the traffic signal ratio associated with the ratio of valid level values to the plurality of sample level values based on the relationship between ratios of valid level values and traffic signal ratios.

The relationship between ratios of valid level values and traffic signal ratios may be statistical based on historical ratios of valid level value and historical traffic signal ratios among a plurality of historical sample level values for the frame signal, which may be fitted as a non-linear curve or may be discrete values, for example. For example, when the traffic signal ratio of the base station is 10%-90%, the ratio of the valid level values among the sample level values of the frame signal is high due to the high traffic signal, and when the traffic signal ratio is below 10%, the ratio of the valid level values among the sample level values of the frame signal is low due to the low traffic signal ratio.

At block 208, the computing unit 140 determines whether the current traffic signal ratio is less than or equal to a predetermined ratio. The predetermined ratio includes, for example, but is not limited to, 10%. It should be understood that 10% is merely illustrative.

If the computing unit 140 determines that the current traffic signal ratio is less than or equal to the predetermined ratio at block 208, the current power is taken as the current pilot power of the current frame signal at block 210.

If the computing unit 140 determines that the current traffic signal ratio is greater than the predetermined ratio at block 208, the current pilot power of the current frame signal is determined based on the current power, the current power floating upper limit and the floating lower limit of the current power at block 212.

The current power floating upper limit and the floating lower limit of the current power are determined, for example, from the lowest value and the highest value of the pilot powers of the previous frames, respectively, and are therefore floating. For the initial case, the current power floating upper limit may be determined as a default value and the current lower power floating limit may be determined as the current power. A method for determining the current pilot power of the current frame signal is described in detail below in conjunction with FIG. 4.

Thus, the pilot powers can be accurately determined for different traffic signal ratios.

Figure 4:
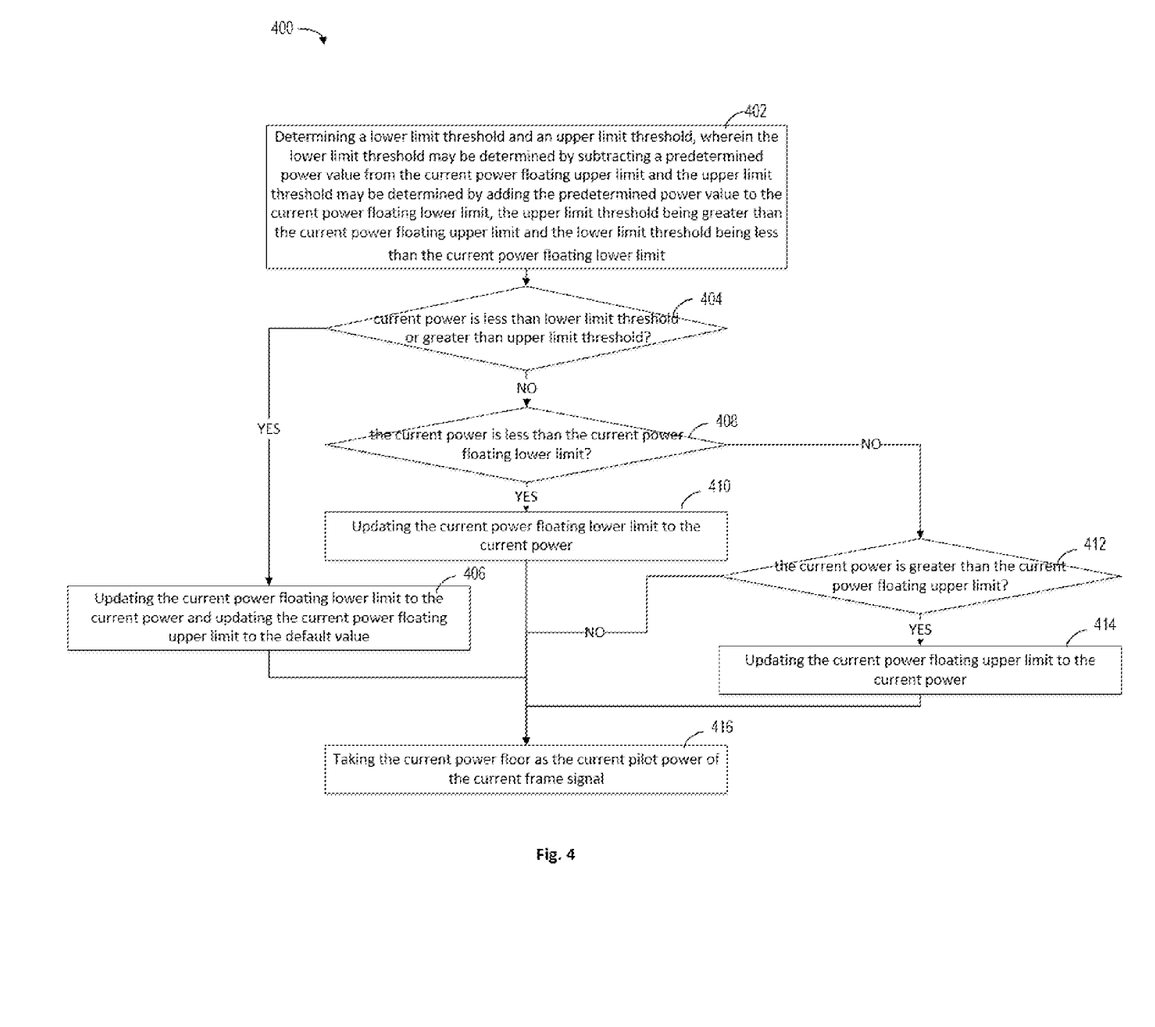
FIG. 4 is a schematic diagram of a method 400 for determining the current pilot power of a current frame signal according to embodiments of the present disclosure.

FIG. 4 illustrates a flow diagram of a method 400 for determining the current pilot power of the current frame signal in accordance with embodiments of the present disclosure. For example, the method 400 may be performed by the computing unit 140 as shown in FIG. 1. It should be appreciated that the method 400 may also include additional blocks not shown and/or may omit the illustrated blocks, and the scope of the present disclosure is not limited in this aspect.

At block 402, the computing unit 140 determines a lower limit threshold and an upper limit threshold, wherein the lower limit threshold may be determined by subtracting a predetermined power value from the current power floating upper limit and the upper limit threshold may be determined by adding the predetermined power value to the current power floating lower limit, the upper limit threshold being greater than the current power floating upper limit and the lower limit threshold being less than the current power floating lower limit.

The predetermined power value indicates an allowable floating range of power, which includes, for example, but not limited to, 10 dB. The 10 dB is for example determined by a measured 6 dB power fluctuation plus a 4 dB guard window. The 4 dB protection window is used to prevent false positives. It should be understood that 10dB is merely exemplary and may be adjusted depending on the configuration of the actual base station and different environmental applications, and the scope of the present disclosure is not limited herein. By additionally adding a fluctuation protection on the current power floating upper limit and the current power floating lower limit, the current power floating upper limit and the current power floating lower limit may be re-determined in case that the current power exceeds or falls below the upper limit threshold or the lower limit threshold determined by the fluctuation protection so as to avoid determining the pilot power floating range frequently. In addition, it is also possible to automatically adjust the upper and lower limits of the current power as the power fluctuates.

At block 404, the computing unit 140 determines whether the current power is less than the lower limit threshold or greater than the upper limit threshold.

The computing unit 140 may first determine whether the current power is less than the lower limit threshold and then determine whether the current power is greater than the upper limit threshold, or the computing unit 140 may first determine whether the current power is greater than the upper limit threshold and then determine whether the current power is less than the lower limit threshold.

If the computing unit 140 determines that the current power is less than the lower limit threshold or greater than the upper limit threshold at block 404, the current power floating lower limit is updated to the current power and the current power floating upper limit is updated to the default value at block 406. Block 416 is then entered.

The default value may include, but are not limited to, −20 dB. It should be understood that −20 dB is only one example for the case where the current power sample is an input power sample point, and the default value may be different for power samples of different natures, such as output powers, reflected powers, etc.

In case that the current power is less than the lower limit threshold or greater than the upper limit threshold, the recalculation of the current power floating upper limit and lower limit is triggered, which may avoid frequent re-determination of the pilot power floating range and is able to accurately track the pilot power floating range.

In some embodiments, before block 406, if the computing unit 140 determines that the current power is less than the lower limit threshold or greater than the upper limit threshold at block 404, a power out-of-range number is updated (not shown). For example, the power out-of-range number is incremented by one. Subsequently, it is determined whether the updated power out-of-range number is greater than or equal to a predetermined number, and if it is determined that the updated power out-of-range number is greater than or equal to the predetermined number, the power out-of-range number is restored to zero (not shown), and block 406 is performed. If it is determined that the updated power out-of-range number is less than the predetermined number, block 416 is entered.

The predetermined number may, for example, include but is not limited to, two. The number of two can both reduce the misjudgment for power out-of-range and ensure a timely response to power out-of-range. In some application scenarios where the accuracy and timeliness requirements are not high, the predetermined number can be adjusted appropriately.

Thus, by triggering the recalculation of the current power floating upper and lower limits only if reaching the predetermined number, it is convenient to filter the interference level and improve the accuracy of triggering.

If, at block 404, the computing unit 140 determines that the current power is greater than or equal to the lower limit threshold and less than or equal to the upper limit threshold, then, at block 408, a determination is made as to whether the current power is less than the current power floating lower limit.

The lower limit threshold is less than the current floating power lower limit, the current power floating lower limit is less than the current power floating upper limit, and the current power floating upper limit is less than the upper limit threshold, which is equivalent to determining whether the current power is greater than or equal to the lower limit threshold and less than the current power floating lower limit.

In some embodiments, if the computing unit 140 determines, at block 404, that the current power is greater than or equal to the lower limit threshold and less than or equal to the upper limit threshold, the computing unit 140 may also restore the power out-of-range number to zero (not shown).

If the computing unit 140 determines, at block 408, that the current power is less than the current power floating lower limit, the current power floating lower limit is updated to the current power at block 410. Block 416 is then entered.

If the computing unit 140 determines, at block 408, that the current power is greater than or equal to the current power floating lower limit, it determines whether the current power is greater than the current power floating upper limit at block 412.

The lower limit threshold is less than the current floating power lower limit, the current power floating lower limit is less than the current power floating upper limit, and the current power floating upper limit is less than the upper limit threshold, which is equivalent to determining whether the current power is less than or equal to the upper limit threshold and greater than the current power floating upper limit.

It should be understood that although FIG. 4 shows block 404 being executed first (i.e. determining whether the current power is less than the lower limit threshold or greater than the upper limit threshold), block 408 being executed next (i.e. determining whether the current power is greater than or equal to the lower limit threshold and less than the current power floating lower limit), and block 412 being executed subsequently (i.e. determining whether the current power is less than or equal to the upper limit threshold and greater than the current power floating upper limit), this is merely an example. Block 404, block 408, and block 412 may be executed in whole or in part in parallel, or in other order. For example, block 404 may be executed first, then block 412 may be executed, then block 408 may be executed, or block 408 may be executed first, then block 404 may be executed, then block 412 may be executed, or block 412 may be executed first, then block 404 may be executed, then block 412 may be executed, etc. The scope of the present disclosure is not limited in this aspect.

If the computing unit 140 determines, at block 412, that the current power is greater than the current power floating upper limit, the current power floating upper limit is updated to the current power at block 414. Block 416 is then entered.

If the computing unit 140 determines, at block 412, that the current power is less than or equal to the current power floating upper limit, block 416 is entered.

At block 416, the computing unit 140 takes the current power floor as the current pilot power of the current frame signal.

Thus, in the case where the current power floating lower limit within the pilot power floating range is found and determined as the pilot power and the current power exceeds the upper limit threshold or is lower than the lower limit threshold, the recalculation of the pilot power floating range is triggered so that the pilot power of the frame can be accurately determined in the case where the traffic signal ratio exceeds the predetermined ratio.

Figure 5:
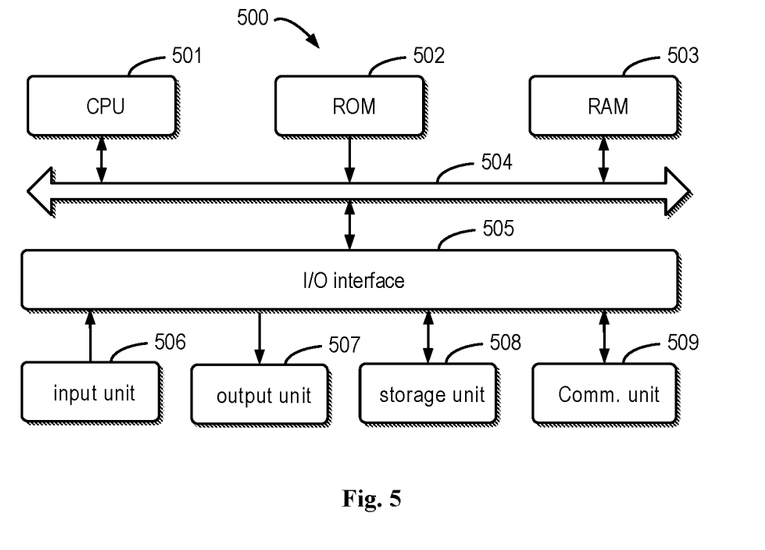
FIG. 5 is a block diagram of an electronic device for implementing the method for determining pilot power in accordance with embodiments of the present disclosure.

FIG. 5 illustrates a schematic block diagram of an example device 500 that may be used to implement embodiments of the present disclosure. For example, the computing unit 140 shown in FIG. 1 may be implemented by the device 500. As shown, the device 500 includes a central processing unit (CPU) 501 that may perform various suitable actions and processes in accordance with computer program instructions stored in a read only memory (ROM) 502 or loaded from a storage unit 508 into a random access memory (RAM) 503. In the random access memory 503, various programs and data required for the operation of the device 500 may also be stored. The central processing unit 501, the read-only memory 502 and the random access memory 503 are connected to each other via a bus 504. An input/output (I/O) interface 505 is also coupled to the bus 504.

A number of components in the device 500 are connected to an input/output interface 505, including: an input unit 506, such as a keyboard, a mouse, a microphone, etc.; an output unit 507 such as various types of displays, speakers, and the like; a storage unit 508, such as a magnetic disk, an optical disk, etc.; and a communication unit 509, such as a network card, a modem, a wireless communication transceiver, etc. The communication unit 509 allows the device 500 to exchange information/data with other devices over a computer network such as the Internet and/or various telecommunication networks.

The various processes and processing described above, such as the methods 200 and 400, may be performed by the central processing unit 501. For example, in some embodiments, the methods 200 and 400 may be implemented as a computer software program tangibly embodied on a machine-readable medium, such as the storage unit 508. In some embodiments, part or all of the computer program may be loaded and/or installed on the device 500 via the read-only memory 502 and/or the communication unit 509. The computer program, when loaded into the random access memory 503 and executed by the central processing unit 501, may implement one or more of the actions of the methods 200 and 400 described above.

The present disclosure is directed to methods, apparatuses, systems, communication devices, computer-readable storage media, and/or computer program products. The computer program product may include computer readable program instructions for performing various aspects of the present disclosure.

A computer-readable storage medium may be a tangible device that can hold and store instructions for use by an instruction executing device. The computer readable storage medium may be, for example but not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD), a memory stick, a floppy disk, a mechanical encoding device such as a punch card or embossed-in-groove structure having instructions stored thereon, and any suitable combination of the foregoing. A computer-readable storage medium, as used herein, is not to be construed as an instantaneous signal itself, such as a radio wave or other freely-propagating electromagnetic wave, an electromagnetic wave propagating through a waveguide or other transmission medium (e. g. an optical pulse through a fiber optic cable), or an electrical signal transmitted through an electrical wire.

The computer-readable program instructions described herein may be downloaded from a computer-readable storage medium to various computing/processing devices, or to external computers or external storage devices over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer readable program instructions from a network and forwards the computer readable program instructions for storage in a computer readable storage medium in the respective computing/processing devices.

Computer program instructions for carrying out operations of the present disclosure may be assembler instructions, Instruction Set Architecture (ISA) instructions, machine instructions, machine related instructions, microcodes, firmware instructions, state setting data, or source or object codes written in any combination of one or more programming languages, including object oriented programming languages, such as Smalltalk, C ++ and the like, and conventional procedural programming languages, such as the "C" language or similar programming languages. The computer-readable program instructions may execute entirely on the user's computer, partly on the user's computer, as a stand-alone software package, partly on the user's computer, partly on a remote computer, or entirely on the remote computer or server. In the case of a remote computer, the remote computer may be connected to the user's computer through any type of network, including a Local Area Network (LAN) or a Wide Area Network (WAN), or it may be connected to an external computer (e. g. through the Internet using an Internet Service Provider). In some embodiments, various aspects of the present disclosure may be implemented by individually customizing an electronic circuit, such as a programmable logic circuit, a Field Programmable Gate Array (FPGA), or a Programmable Logic Array (PLA), with state information of computer-readable program instructions.

Various aspects of the disclosure are described herein with reference to flowchart illustrations and/or block diagrams of methods, apparatus (systems) and computer program products according to embodiments of the disclosure. It will be understood that each block of the flowcharts and/or block diagrams, and combinations of blocks in the flowcharts and/or block diagrams, can be implemented by computer-readable program instructions.

These computer-readable program instructions may be provided to a processing unit of a general purpose computer, a special purpose computer, or other programmable data processing apparatus to produce a machine, such that the instructions, being executed by the processing unit of the computer or other programmable data processing apparatus, may create means for implementing the functions/actions specified in one or more blocks of the flowcharts and/or block diagrams. These computer-readable program instructions may also be stored in a computer-readable storage medium, which may cause a computer, a programmable data processing apparatus, and/or other devices to function in a particular manner, such that the computer-readable medium having the instructions stored thereon may include an article of manufacture including instructions which implement various aspects of the functions/actions specified in one or more blocks of the flowcharts and/or block diagram blocks.

The computer readable program instructions may also be loaded onto a computer, other programmable data processing apparatus, or other devices to cause a series of operational steps to be performed on the computer, the other programmable data processing apparatus, or the other devices to produce a computer implemented process such that the instructions which are executed on the computer, other programmable data processing apparatus, or other devices may implement the functions/actions specified in one or more blocks of the flowcharts and/or block diagrams.

The flowcharts and block diagrams in the figures illustrate the architecture, functionality, and operations of possible implementations of systems, methods and computer program products according to various embodiments of the present disclosure. In this regard, each block in the flowcharts or block diagrams may represent a module, segment, or portion of an instruction, which comprises one or more executable instructions for implementing the specified logical function(s). In some alternative implementations, the functions noted in the blocks may occur out of the order noted in the figures. For example, two successive blocks may in fact be executed substantially in parallel, or they may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems which perform the specified functions or actions, or combinations of special purpose hardware and computer instructions.

Having described embodiments of the present disclosure, the foregoing description is exemplary, not exhaustive, and not limited to the disclosed embodiments. Many modifications and variations will be apparent to those of ordinary skill in the art without departing from the scope and spirit of the described embodiments. The terminology used herein was chosen in order to explain the principles of the embodiments, the practical application, or the technological improvements of the technology on the market, or to enable others of ordinary skill in the art to understand the embodiments disclosed herein.

What is claimed is:

1. A method for determining pilot power, comprising:
    acquiring a plurality of sample level values of a received current frame signal;
    determining a current power of the current frame signal based on the plurality of sample level values;
    determining a current traffic signal ratio of the current frame signal based on the plurality of sample level values;
    taking the current power as a current pilot power of the current frame signal if it is determined that the current traffic signal ratio is less than or equal to a predetermined ratio; and
    determining the current pilot power of the current frame signal based on the current power, the current power floating upper limit and the current power floating lower limit if it is determined that the current traffic signal ratio is greater than the predetermined ratio.

2. The method of claim 1, wherein determining the current power of the current frame signal comprises:
    ranking the plurality of sample level values based on a detection characteristic to generate a ranking result;
    determining a plurality of valid level values from the ranking result, the plurality of valid level values ranking in the ranking result by a predetermined percentage;
    determining an average of the plurality of valid level values; and
    determining the current power based on the average of the plurality of valid level values.

3. The method of claim 1, wherein determining the current traffic signal ratio of the current frame signal comprises:
    determining an average of the plurality of sample level values; and
    determining the traffic signal ratio associated with the average of the plurality of sample level values as the current traffic signal ratio based on a relationship between level values and traffic signal ratios.

4. The method of claim 1, wherein determining the current traffic signal ratio of the current frame signal comprises:
    determining a ratio of valid level values to the plurality of sample level values, wherein the valid level values are sample level values greater than or equal to a predetermined level value; and
    determining, as the current traffic signal ratio, the traffic signal ratio associated with the ratio of valid level values to the plurality of sample level values based on a relationship between ratios of valid level values and traffic signal ratios.

5. The method of claim 1, wherein determining the current pilot power of the current frame signal comprises:
    determining a lower limit threshold and an upper limit threshold, wherein the lower limit threshold is determined by subtracting a predetermined power value from the current power floating upper limit and the upper limit threshold is determined by adding the predetermined power value to the current power floating lower limit, the upper limit threshold being greater than the current power floating upper limit and the lower limit threshold being less than the current power floating lower limit;
    updating the current power floating lower limit to the current power and updating the current power floating upper limit to a default value if it is determined that the current power is less than the lower limit threshold or greater than the upper limit threshold;
    updating the current power floating lower limit to the current power if it is determined that the current power is greater than or equal to the lower limit threshold and is less than the current power floating lower limit;
    updating the current power floating upper limit to the current power if it is determined that the current power is greater than the current power floating upper limit and is less than or equal to the upper limit threshold; and taking the current power floating lower limit as the current pilot power.

6. The method of claim 5, wherein updating the current power floating lower limit to the current power and updating the current power floating upper limit to the default value comprises:
    updating a power out-of-range number; and
    if it is determined that the updated power out-of-range number is greater than or equal to a predetermined number:
        restoring the power out-of-range number to zero;
        updating the current power floating lower limit to the current power; and
        updating the current power floating upper limit to the default value.

7. The method of claim 6, wherein determining the current pilot power of the current frame signal further comprises:
restoring the power out-of-range number to zero if it is determined that the current power is greater than or equal to the lower limit threshold and less than or equal to the upper limit threshold.

8. The method of claim 5, wherein the predetermined power value comprises 10 dB.

9. A communication device comprising:
at least one processor; and
a memory communicatively coupled to the at least one processor; wherein,
the memory stores instructions executable by the at least one processor to cause the communication device to at least:
acquire a plurality of sample level values of a received current frame signal;
determine a current power of the current frame signal based on the plurality of sample level values;
determine a current traffic signal ratio of the current frame signal based on the plurality of sample level values;
take the current power as a current pilot power of the current frame signal if it is determined that the current traffic signal ratio is less than or equal to a predetermined ratio; and
determine the current pilot power of the current frame signal based on the current power, the current power floating upper limit and the current power floating lower limit if it is determined that the current traffic signal ratio is greater than the predetermined ratio.

10. The communication device of claim 9, further comprising:
a coupling unit configured to couple with a signal main path to acquire the current frame signal received on the signal main path;
a detection unit configured to perform power detection on the acquired current frame signal to generate a power level of the current frame signal, and a low-pass filtering capacitor port and a level output port of the detection circuit are respectively provided with filter capacitors of 4.7 nF and 10 nF; and
an analog-to-digital conversion unit configured to sample the generated power level to obtain the plurality of sample level values of the current frame signal.

11. The communication device of claim 9, wherein the communication device being caused to determine the current power of the current frame signal includes being caused to:
rank the plurality of sample level values based on a detection characteristic to generate a ranking result;
determine a plurality of valid level values from the ranking result, the plurality of valid level values ranking in the ranking result by a predetermined percentage;
determine an average of the plurality of valid level values; and
determine the current power based on the average of the plurality of valid level values.

12. The communication device of claim 9, wherein the communication device being caused to determine the current traffic signal ratio of the current frame signal includes being caused to:
determine an average of the plurality of sample level values; and
determine the traffic signal ratio associated with the average of the plurality of sample level values as the current traffic signal ratio based on a relationship between level values and traffic signal ratios.

13. The communication device of claim 9, wherein the communication device being caused to determine the current traffic signal ratio of the current frame signal includes being caused to:
determine a ratio of valid level values to the plurality of sample level values, wherein the valid level values are sample level values greater than or equal to a predetermined level value; and
determine, as the current traffic signal ratio, the traffic signal ratio associated with the ratio of valid level values to the plurality of sample level values based on a relationship between ratios of valid level values and traffic signal ratios.

14. The communication device of claim 9, wherein the communication device being caused to determine the current pilot power of the current frame signal includes being caused to:
determine a lower limit threshold and an upper limit threshold, wherein the lower limit threshold is determined by subtracting a predetermined power value from the current power floating upper limit and the upper limit threshold is determined by adding the predetermined power value to the current power floating lower limit, the upper limit threshold being greater than the current power floating upper limit and the lower limit threshold being less than the current power floating lower limit;
update the current power floating lower limit to the current power and updating the current power floating upper limit to a default value if it is determined that the current power is less than the lower limit threshold or greater than the upper limit threshold;
update the current power floating lower limit to the current power if it is determined that the current power is greater than or equal to the lower limit threshold and is less than the current power floating lower limit;
update the current power floating upper limit to the current power if it is determined that the current power is greater than the current power floating upper limit and is less than or equal to the upper limit threshold; and
take the current power floating lower limit as the current pilot power.

15. A non-transitory computer-readable storage medium storing computer program instructions that in response to execution by a processor, causes an apparatus to at least:
acquire a plurality of sample level values of a received current frame signal;
determine a current power of the current frame signal based on the plurality of sample level values;
determine a current traffic signal ratio of the current frame signal based on the plurality of sample level values;
take the current power as a current pilot power of the current frame signal if it is determined that the current traffic signal ratio is less than or equal to a predetermined ratio; and
determine the current pilot power of the current frame signal based on the current power, the current power floating upper limit and the current power floating lower limit if it is determined that the current traffic signal ratio is greater than the predetermined ratio.

16. The non-transitory computer-readable storage medium of claim 15, wherein the apparatus being further caused to:
couple with a signal main path to acquire the current frame signal received on the signal main path;

perform power detection on the acquired current frame signal to generate a power level of the current frame signal, and sample the generated power level to obtain the plurality of sample level values of the current frame signal.

17. The non-transitory computer-readable storage medium of claim 15, wherein the apparatus being caused to determine the current power of the current frame signal includes being caused to:

rank the plurality of sample level values based on a detection characteristic to generate a ranking result;

determine a plurality of valid level values from the ranking result, the plurality of valid level values ranking in the ranking result by a predetermined percentage;

determine an average of the plurality of valid level values; and determine the current power based on the average of the plurality of valid level values.

18. The non-transitory computer-readable storage medium 15, wherein the apparatus being caused to determine the current traffic signal ratio of the current frame signal includes being caused to:

determine an average of the plurality of sample level values; and determine the traffic signal ratio associated with the average of the plurality of sample level values as the current traffic signal ratio based on a relationship between level values and traffic signal ratios.

19. The non-transitory computer-readable storage medium of claim 15, wherein the apparatus being caused to determine the current traffic signal ratio of the current frame signal includes being caused to:

determine a ratio of valid level values to the plurality of sample level values, wherein the valid level values are sample level values greater than or equal to a predetermined level value; and determine, as the current traffic signal ratio, the traffic signal ratio associated with the ratio of valid level values to the plurality of sample level values based on a relationship between ratios of valid level values and traffic signal ratios.

20. The non-transitory computer-readable storage medium of claim 15, wherein the apparatus being caused to determine the current pilot power of the current frame signal includes being caused to:

determine a lower limit threshold and an upper limit threshold, wherein the lower limit threshold is determined by subtracting a predetermined power value from the current power floating upper limit and the upper limit threshold is determined by adding the predetermined power value to the current power floating lower limit, the upper limit threshold being greater than the current power floating upper limit and the lower limit threshold being less than the current power floating lower limit;

update the current power floating lower limit to the current power and updating the current power floating upper limit to a default value if it is determined that the current power is less than the lower limit threshold or greater than the upper limit threshold;

update the current power floating lower limit to the current power if it is determined that the current power is greater than or equal to the lower limit threshold and is less than the current power floating lower limit;

update the current power floating upper limit to the current power if it is determined that the current power is greater than the current power floating upper limit and is less than or equal to the upper limit threshold; and take the current power floating lower limit as the current pilot power.

* * * * *